US012810788B2

(12) United States Patent
Lee et al.

(10) Patent No.: US 12,810,788 B2
(45) Date of Patent: Nov. 24, 2026

(54) DISPLAY SYSTEM INCLUDING DISPLAY DEVICE AND CAMERA, AND DRIVING METHOD OF DISPLAY SYSTEM

(71) Applicant: Samsung Display Co., Ltd., Yongin-Si (KR)

(72) Inventors: Kyung Su Lee, Yongin-si (KR); Hyung Jin Kim, Yongin-si (KR); Seok Ha Hong, Yongin-si (KR); Kang Hee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/092,945

(22) Filed: Mar. 27, 2025

(65) Prior Publication Data

US 2025/0384827 A1 Dec. 18, 2025

(30) Foreign Application Priority Data

Jun. 17, 2024 (KR) ........................ 10-2024-0078202
Jul. 10, 2024 (KR) ........................ 10-2024-0091136

(51) Int. Cl.

| | |
|---|---|
| ***G09G 3/3208*** | (2016.01) |
| ***H04N 23/54*** | (2023.01) |
| ***H04N 23/55*** | (2023.01) |
| ***H04N 25/51*** | (2023.01) |

(52) U.S. Cl.

CPC ........... *G09G 3/3208* (2013.01); *H04N 23/54* (2023.01); *H04N 23/55* (2023.01); *H04N 25/51* (2023.01); *G09G 2310/027* (2013.01); *G09G 2320/0233* (2013.01)

(58) Field of Classification Search

None

See application file for complete search history.

(56) References Cited

U.S. PATENT DOCUMENTS

| | | | | |
|---|---|---|---|---|
| 11,984,068 | B2 | 5/2024 | Lee et al. | |
| 2016/0063954 | A1* | 3/2016 | Ryu | G09G 3/20 345/589 |
| 2019/0180679 | A1* | 6/2019 | Choi | G09G 3/3208 |
| 2019/0306384 | A1* | 10/2019 | Hirotsune | G01J 1/42 |

(Continued)

FOREIGN PATENT DOCUMENTS

| | | | |
|---|---|---|---|
| KR | 1020220093873 | A | 7/2022 |
| KR | 1020220167439 | A | 12/2022 |

*Primary Examiner* — Donna V Bocar

(74) *Attorney, Agent, or Firm* — Innovation Counsel LLP

(57) ABSTRACT

A display system is disclosed that includes a display device, a camera, and a host. The display device includes a first area where a fixed pattern is displayed and a second area where content is displayed. The display device is configured to display an image in the first region and the second region by referring to a memory where a gain value is stored. The camera is configured to generate a captured image by capturing at least a part of the first region or at least a part of the second region around the first region and capturing an image of the display device that displays a high-grayscale image. The host is configured to receive the captured image and updates the gain value based on a luminance difference between the first area and the second area. According to the display system and a driving method thereof, it is possible to check whether a gain value of a display device is appropriate and to update the gain value.

15 Claims, 15 Drawing Sheets

(56) References Cited

U.S. PATENT DOCUMENTS

| | | | | |
|---|---|---|---|---|
| 2021/0029347 | A1* | 1/2021 | Yoo | G09G 3/006 |
| 2022/0208090 | A1* | 6/2022 | Lee | G09G 3/3208 |
| 2022/0398961 | A1 | 12/2022 | Lee et al. | |

* cited by examiner

LUT 810 820

| TIME | GAIN VALUE |
|---|---|
| t1 | GAIN1 |
| ⋮ | ⋮ |
| t2 | GAIN2 |

LUT 810 820

| TIME | GAIN VALUE |
|---|---|
| t1 | GAIN1 |
| ⋮ | ⋮ |
| t2 | GAIN_UPDATE |

DISPLAY SYSTEM INCLUDING DISPLAY DEVICE AND CAMERA, AND DRIVING METHOD OF DISPLAY SYSTEM

CROSS-REFERENCE TO RELATED APPLICATION

This application claims priority to and the benefit of Korean Patent Applications No. 10-2024-0078202 filed in the Korean Intellectual Property Office on Jun. 17, 2024, and No. 10-2024-0091136 filed in the Korean Intellectual Property Office on Jul. 10, 2024, the entire contents of which are incorporated herein by reference.

BACKGROUND OF THE INVENTION

(a) Field of the Invention

The present disclosure relates to a display system and a driving method thereof.

(b) Description of the Related Art

With the development of information technology, the importance of display devices which are connection mediums between users and information is being highlighted. Accordingly, the use of display devices, such as liquid crystal display devices and organic light emitting display devices, is increasing.

Display devices may degrade with use. For example, light efficiencies of organic light emitting display devices may decrease as light emitting elements are degraded with use. To this end, gain values for compensating for a decrease in luminance of the light emitting elements may be stored in display devices.

Such gain values are set at the time when display devices are shipped, and it is difficult to determine whether such gain values are excessive or insufficient after the display devices are shipped. In addition, it is difficult to modify such gain values.

Therefore, it is desirable to determine whether the gain values are appropriate in the environment in which the display devices are used, and to modify the gain values according to the use environment.

SUMMARY OF THE INVENTION

The present disclosure may provide a display system that checks whether a gain value of a display device is appropriate and update the gain value, and a driving method of the display system.

An embodiment of a display system includes a display device including a first area where a fixed pattern is displayed and a second area where content is displayed, and configured to display an image in the first region and the second region by referring to a memory where a gain value is stored; a camera configured to generate a captured image by capturing at least a part of the first region or at least a part of the second region around the first region and capturing an image of the display device that displays a high-grayscale image; and a host configured to receive the captured image and update the gain value based on a luminance difference between the first area and the second area.

The host may include an image output unit configured to output first image data corresponding to the image; a luminance analyzer configured to generate an updated gain value by receiving the captured image and detecting the luminance difference between the first area and the second area; and a gain update unit configured to write an updated gain value to the display device.

The luminance analyzer may set luminance of the second area as a reference luminance and compare luminance of the first area with the reference luminance.

The luminance analyzer may determine that the gain value of the display device is insufficiently compensated when the luminance of the first area is lower than the reference luminance and set a gain value greater than the gain value as the updated gain value.

The luminance analyzer may determine that the gain value of the display device is excessively compensated when the luminance of the first area is higher than the reference luminance, and set a gain value less than the gain value as the updated gain value.

The camera may capture an image of the display device on an opposite side of the display device.

The display system may further include a mirror positioned on an opposite side of the display device and the camera, and a darkroom surrounding the display device, the camera, and the mirror. The camera may capture an image of the display device reflected on the mirror within the darkroom.

The host may cause the mirror to be positioned opposite the display device and the camera. The host may control the darkroom to be unfolded by surrounding the display device, the camera, and the mirror.

The fixed pattern may include at least one of a time icon, a communication state icon, and a temperature icon.

A gain value for each color may be stored in the memory.

An embodiment of a method of driving a display system includes displaying a high-grayscale image by a display device; capturing an image of the display device by a camera; receiving, by a host, an image captured by the camera; comparing luminance between a first area and a second area from the captured image received by the host; and updating, by the host, gain values of each color of the display device based on a comparison result.

The capturing of the image of the display device by the camera may include capturing an image of the display device by the camera on an opposite side of the display device.

The capturing of the image of the display device by the camera may include disposing a mirror on an opposite side of the display device by the host; unfolding a darkroom surrounding the mirror and the display device by the host; and capturing, by the camera, an image of the display device reflected in the mirror within the darkroom.

The camera may be embedded in the display device.

In the displaying of the high-grayscale image by the camera, the display device may display a white-grayscale image.

The first area may be an area in which a fixed pattern is displayed. The second area may be an area in which content is displayed.

The fixed pattern may include at least one of a time icon, a communication state icon, and a temperature icon.

In the comparing of the luminance between the first area and the second area from the captured image received by the host, the host may set luminance of the second area as a reference luminance and compare luminance of the first area with the reference luminance.

When the luminance of the first area is lower than the reference luminance, the host may determine that one of the gain values of each color of the display device is insufficiently compensated, and may set a gain value greater than the one of the gain values as an updated gain value.

When the luminance of the first area is higher than the reference luminance, the host may determine that one of the gain values of each color of the display device is excessively compensated, and may set a gain value less than the one of the gain values as an updated gain value.

DETAILED DESCRIPTION OF THE EMBODIMENTS

Figure 1:
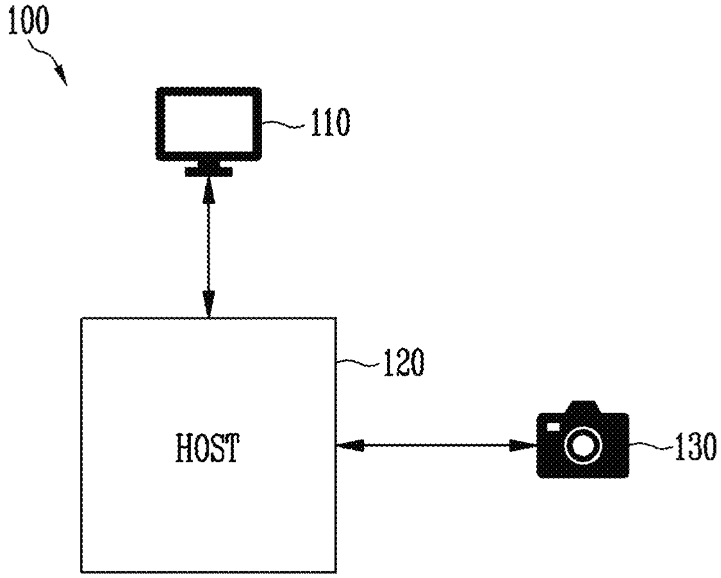
FIG. 1 is a block diagram of a display system according to embodiments of the present disclosure.

Hereinafter, various embodiments of the present disclosure will be described in detail with reference to the attached drawings such that those skilled in the art to which the present disclosure belongs may easily implement the present disclosure. The present disclosure may be implemented in various different forms and is not limited to the embodiments described herein.

In order to clearly describe the present disclosure, parts that are not related to the description are omitted, and the same reference numerals are assigned to the same or similar components throughout the specification. Therefore, the reference numerals described above may also be used in other drawings.

In addition, sizes and thicknesses of the component illustrated in the drawings are randomly illustrated for the sake of convenience of description, and accordingly, the present disclosure is not necessarily limited to the illustration. In order to clearly describe various layers and areas in the drawings, thicknesses may be exaggerated.

In addition, the expression "same" in the description may mean "substantially the same". That is, the expression "same" may be the same to the extent that those skilled in the art may be convinced that it is the same. Other expressions may also be expressions where "substantially" is omitted.

Although terms, such as first and second, may be used to describe various components, such components are not limited to the terms. The terms are used only for the purpose of distinguishing one component from another component. For example, without departing from the scope of the present disclosure, the first component may be referred to as the second component, and similarly, the second component may also be referred to as the first component. Singular expressions include plural expressions unless the context clearly indicates otherwise.

The terms "below or under," "on a lower side" "above or over," and "on an upper side" are used to describe relationships between components illustrated in the drawings. The terms are relative concepts and are described based on the directions illustrated in the drawings.

Unless otherwise defined, all terms (including technical and scientific terms) used herein have the same meaning as commonly understood by those skilled in the art to which the present disclosure belongs. In addition, terms such as terms defined in commonly used dictionaries should be interpreted as having a meaning consistent with their meaning in the context of the relevant technology, and are explicitly defined herein, unless the terms are interpreted in an ideal or overly formal sense.

It should be understood that terms such as "include", "comprise", and "have" are intended to specify the presence of features, numbers, steps, operations, components, parts, or combinations thereof described in the specification, but do not preclude the possibility of the presence or addition of one or more other features, numbers, steps, operations, components, parts, or combinations thereof.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Hereinafter, embodiments of the present disclosure will be described in detail with reference to the attached drawings.

FIG. 1 is a block diagram of a display system 100 according to embodiments of the present disclosure.

Referring to FIG. 1, a display system 100 according to embodiments of the present disclosure may include a display device 110, a host 120, and a camera 130.

The display device 110 may communicate with the host 120 through a wireless method or a wired method. The camera 130 may communicate with the host 120 through a wireless method or a wired method.

Figure 2A:
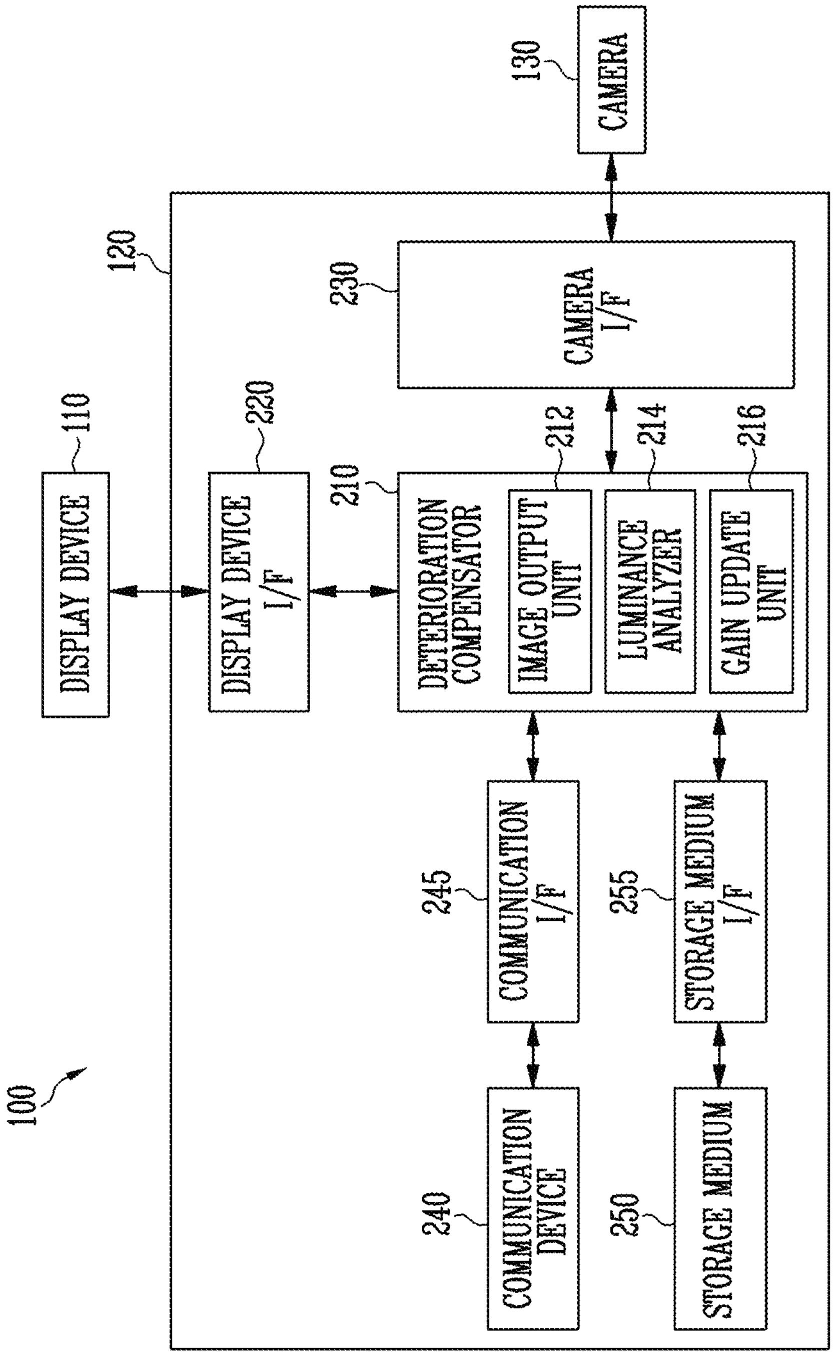
FIG. 2A is an embodiment specifically illustrating a host in the block diagram of FIG. 1.
Figure 2B:
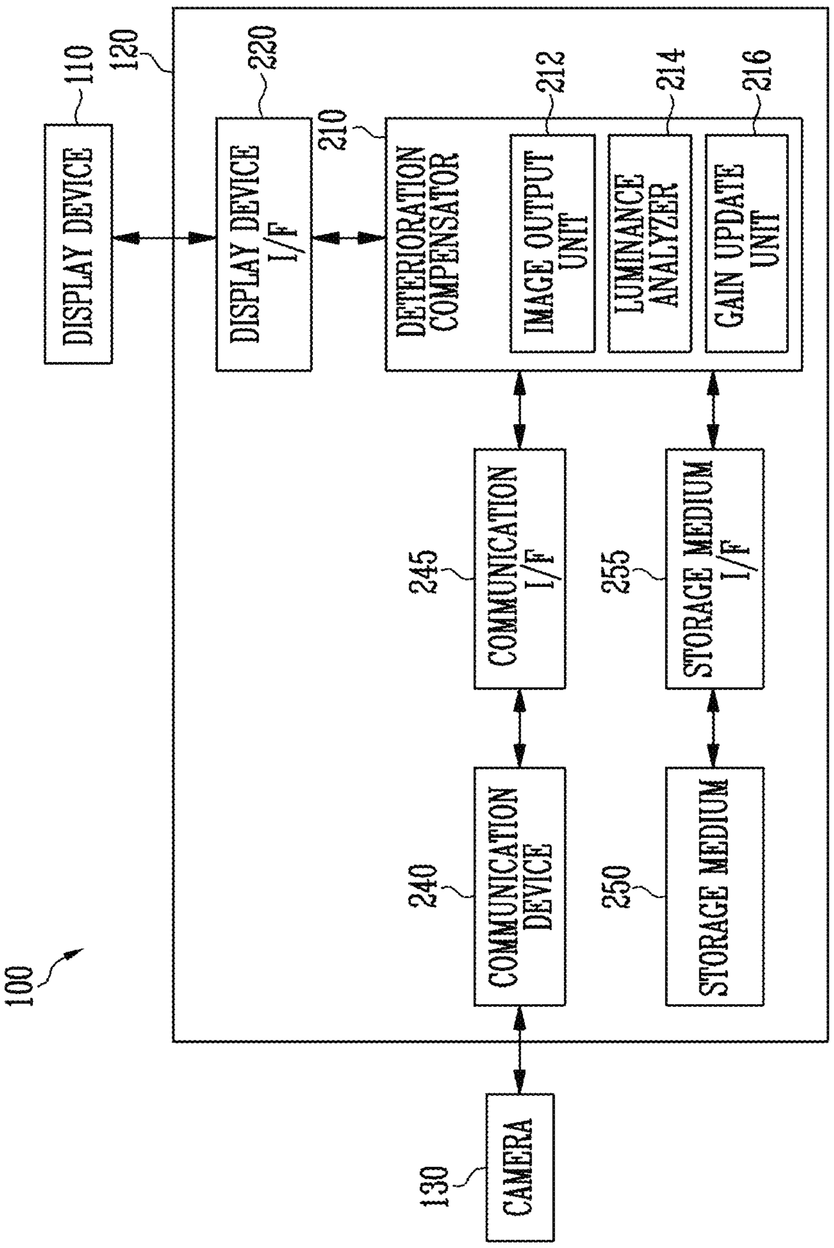
FIG. 2B is another embodiment specifically illustrating the host in the block diagram of FIG. 1.

FIG. 2A is an embodiment of the display system 100 that illustrates the host 120 in the block diagram of FIG. 1. FIG. 2B is an embodiment the display system 100 that illustrates the host 120 in the block diagram of FIG. 1.

The host 120 may include a set-top box, an application processor (AP), a graphic processing unit (GPU), and so on. In one embodiment, the host 120 may also be an external component of the display device 110 which is not included in the display device 110. In one embodiment, the host 120 may be embedded in the display device 110. The host 120 may transmit and receive data or control signals to and from the display device 110 through a predetermined interface. The interface may be, for example, a serial programming interface (SPI), an inter integrated circuit (I2C), a mobile industry processor interface (MIPI), or so on. However, the embodiments of the present disclosure are not limited thereto.

Referring to FIG. 2A, the host 120 may include a deterioration compensator 210, a display device interface (I/F) 220, a camera interface 230, a communication device 240, a communication interface 245, a storage medium 250, a storage medium interface (255), and so on.

The deterioration compensator 210 is configured to control all operations of the host 120. The deterioration compensator 210 may communicate with the display device 110 through the display device interface 220. The deterioration compensator 210 may communicate with the camera 130 through the camera interface 230. The deterioration compensator 210 may display images stored in the storage medium 250 through the display device 110. In addition, the deterioration compensator 210 may receive a user's image that is captured by the camera 130 or transmitted through the communication device 240.

The display device interface 220 may interface between the display device 110 and the deterioration compensator 210. The display device interface 220 may control the display device 110 according to data (for example, an image) from the deterioration compensator 210 such that the display device 110 may visualize the data.

The camera interface 230 may interface between the camera 130 and the deterioration compensator 210. The camera interface 230 may transmit control signals or data from the deterioration compensator 210 to the camera 130. Referring to FIG. 2A, the camera interface 230 may transmit data (for example, a captured image) received from the camera 130 to the deterioration compensator 210.

The communication device 240 may support the establishment of a wired or wireless communication channel between the host 120 and another electronic device (for example, the display device 110, the camera 130, or so on), and the performance of communication through the established communication channel. In one embodiment, the communication device 240 may include a wireless communication module or a wired communication module. The wireless communication module may include, for example, a cellular communication module, a short-range communication module, or a global navigation satellite system (GNSS) communication module. The wired communication module may include, for example, a local area network (LAN) communication module, a power line communication module, and so on. The communication device 240 may communicate with other electronic devices through a short-range communication network or a long-range communication network. The short-range communication network may include, for example, Bluetooth®, wireless fidelity (Wi-Fi) direct, or infrared data association (IrDA), and so on. The long-range communication network may include a computer network, such as a LAN or a wide area network (WAN). The communication device 240 described above may be implemented by a single chip or may be implemented by separate chips.

The communication interface 245 may interface between the communication device 240 and the deterioration compensator 210. The communication interface 245 may access other electronic devices on a network through the communication device 240 under the control of the deterioration compensator 210. Referring to FIG. 2B, the communication interface 245 may receive data (for example, a captured image) from another electronic device (for example, the camera 130) on the network through the communication device 240 and transmit the data to the deterioration compensator 210.

The storage medium 250 may store various types of data used by at least one component (for example, the deterioration compensator 210) of the display system 100 and input data or output data for commands related thereto. The storage medium 250 may include at least one of volatile memory and nonvolatile memory.

The storage medium interface 255 may interface between the storage medium 250 and the deterioration compensator 210. The storage medium interface 255 may write data to the storage medium 250 under the control of the deterioration compensator 210. The storage medium interface 255 may read the data stored in the storage medium 250 under the control of the deterioration compensator 210 and provide the read data to the deterioration compensator 210. The storage medium 250 is configured to store data. The storage medium 250 may include at least one of non-volatile storage media.

The deterioration compensator 210 according to the embodiments of the present disclosure may include an image output unit 212 that outputs a pattern to be displayed on the display device 110. The image output unit 212 may provide, for example, a high-grayscale image (for example, a full-white-grayscale image) to the display device 110.

The deterioration compensator 210 according to the embodiments of the present disclosure may include a luminance analyzer 214 that analyzes the luminance of an image captured by the camera 130. The luminance analyzer 214 may detect the luminance of each area of the captured image and detect whether the luminance of a certain area (for example, an area where a fixed pattern, such as a logo, is displayed) is relatively bright or dark.

Referring to FIGS. 2A and 2B, the deterioration compensator 210 may be implemented with hardware or software or a combination thereof including one or more integrated circuits and executable code.

The deterioration compensator 210 according to the embodiments of the present disclosure may be configured to provide the display device 110 with an updated gain value obtained by increasing or decreasing a gain value (for example, a gain value for each color) according to the relative luminance detected by the luminance analyzer 214.

Figure 3:
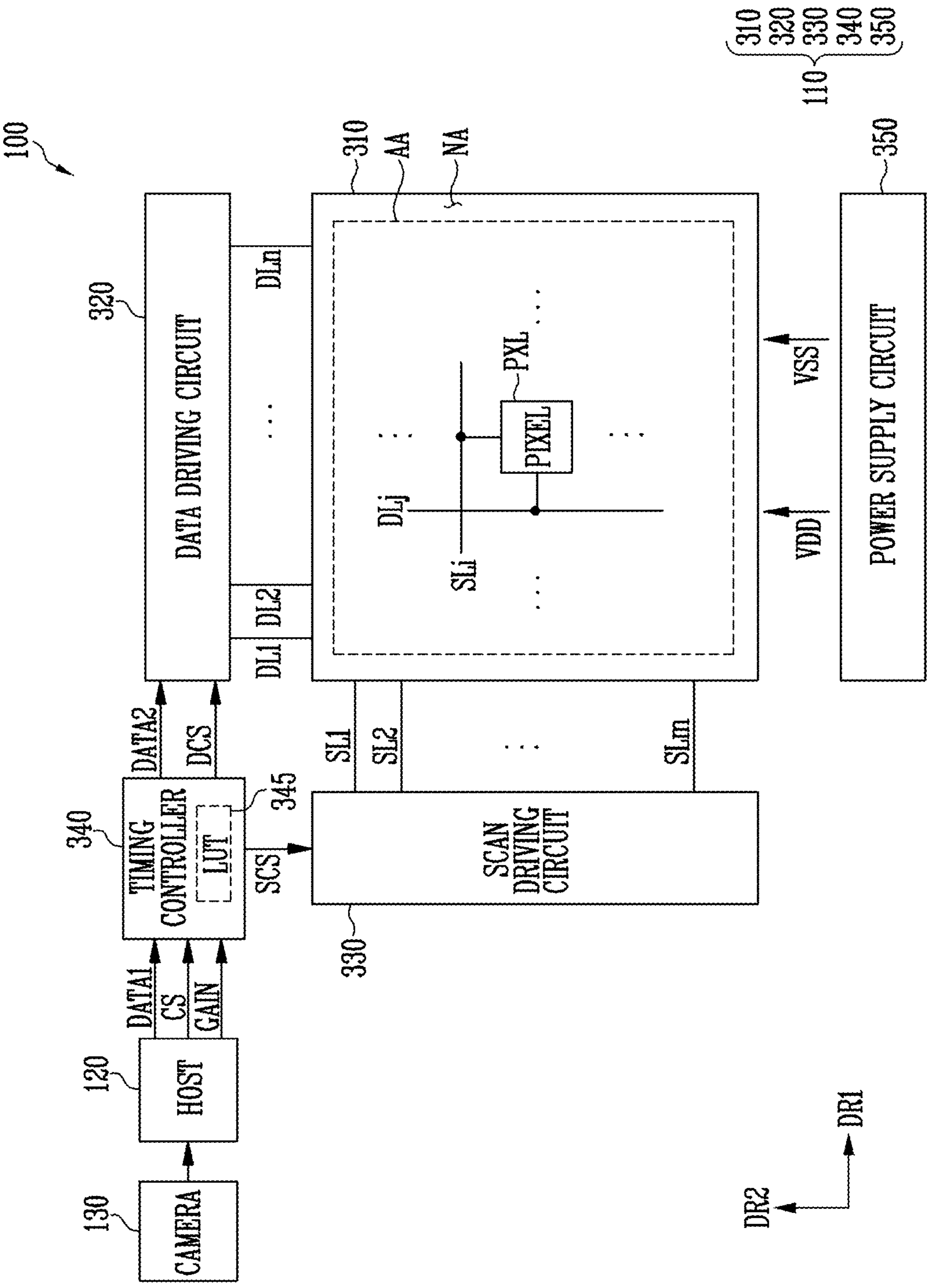
FIG. 3 is an embodiment specifically illustrating a display device in the block diagram of FIG. 1.

FIG. 3 is an embodiment that specifically illustrates the display device 110 in the block diagram of FIG. 1.

Referring to FIG. 3, the display device 110 according to the embodiments of the present disclosure may include a display panel 310, a data driving circuit 320, a scan driving circuit 330, a timing controller 340, and a power supply circuit 350.

A plurality of pixels PXL are disposed in the display panel 310. A plurality of data lines DLI to DLn (n is an integer of 2 or greater) and a plurality of scan lines SL1 to SLm (m is an integer of 2 or greater) electrically connected to a plurality of pixels PXL may be disposed in the display panel 310. One or more power voltage lines configured to apply a power voltage (for example, a first power voltage VDD, a second power voltage VSS, and so on) to the plurality of pixels PXL may be disposed in the display panel 310.

The display panel 310 may include a display area AA in which the plurality of pixels PXL are disposed, and a non-display area NA located in a periphery (for example, an edge of the display area AA) of the display area AA.

The display panel 310 may be formed to be flat, but embodiments of the present disclosure are not limited thereto. For example, the display panel 310 may include curved portions formed at left and right ends. The curved surfaces may each have a constant curvature or a changing curvature. In addition, the display panel 310 may be flexibly formed to be bent, curved, folded, or rolled.

The plurality of pixels PXL may be disposed in a matrix type in the display area AA. According to an embodiment, the plurality of pixels PXL may be disposed in a PENTILE® structure in the display area AA.

The plurality of data lines DLI to DLn may extend in one direction from the display panel 310. The one direction may be, for example, the second direction DR2. The plurality of data lines DLI to DLn may extend in the second direction DR2 (for example, entirely in the second direction DR2) from the display panel 310. The second direction DR2 may be, for example, a direction crossing from an upper side to a lower side of the display panel 310, but the embodiments of the present disclosure are not limited thereto.

The plurality of scan lines SL1 to SLm may extend in one direction from the display panel 310. The one direction may be, for example, the first direction DR1. The plurality of scan lines SL1 to SLm may extend in the first direction DR1 (for example, entirely in the first direction DR1) from the display panel 310. The first direction DR1 may be a different direction from the second direction DR2, but the embodiments of the present disclosure are not limited thereto. The first direction DR1 may be, for example, a direction crossing from the left side to the right side of the display panel 310.

The data driving circuit 320 may be configured to supply a data voltage to the plurality of data lines DLI to DLn. The data driving circuit 320 may generate a data voltage based on second image data DATA2 and a data driving circuit control signal DCS, and output the generated data voltage to the plurality of data lines DLI to DLn according to timing. The data driving circuit control signal DCS may include, for example, a source start pulse (SSP) signal, a source shift clock (SSC) signal, a source output enable (SOE) signal, and so on.

The data driving circuit 320 may be implemented by an integrated circuit (for example, a source driver integrated circuit (SDIC)) formed separately from the display panel 310 or may be formed together with the display panel 310 in at least a part of the non-display area NA of the display panel 310.

The scan driving circuit 330 is configured to output a scan signal to the plurality of scan lines SL1 to SLm in response to a scan driving circuit control signal SCS. The scan driving circuit control signal SCS may include a start signal indicating the start of a frame, a horizontal synchronization signal for outputting a scan signal according to the timing at which a data voltage is applied, and so on.

The scan driving circuit 330 may be implemented by an integrated circuit (for example, a gate driving integrated circuit (GDIC)) formed separately from the display panel 310 or may be formed together with the display panel 310 in at least a part of the non-display area NA of the display panel 310.

The timing controller 340 may be configured to control the data driving circuit 320 and the scan driving circuit 330. The timing controller 340 may generate and output the control signals DCS and SCS for respectively controlling the data driving circuit 320 and the scan driving circuit 330 based on a control signal CS (for example, a synchronization signal, a clock signal, a data enable signal, or so on) input through the host 120. According to an embodiment, the timing controller 340 may generate a synchronization signal, a data enable signal, and so on, based on the control signal CS (for example, information on a drive frequency (or a frame rate) of an image displayed on the display panel 310) input through the host 120.

The timing controller 340 may receive first image data DATA1 from the host 120 and align the input first image data DATA1 in units of pixel row. The timing controller 340 may convert the input first image data DATA1 according to a preset interface (for example, low voltage differential signaling (LVDS), a display port (DP), an embedded display port (eDP), or so on). The second image data DATA2, which is output from the timing controller 340 to the data driving circuit 320, may be converted internally by the timing controller 340 according to the preset interface.

The timing controller 340 may generate the second image data DATA2 based on the input first image data DATA1. The second image data DATA2 may be obtained by compensating for a change (for example, a change in characteristic value due to deterioration of a circuit element and so on) in characteristic value of the pixel PXL.

In one embodiment, the timing controller 340 may include a memory 345 in which a lookup table LUT is stored. The lookup table LUT may store a gain value GAIN for compensating for a decrease in luminance caused by deterioration of a light emitting element included in the pixel PXL over time. The gain value GAIN may be set differently for each color (for example, red, green, and blue). In embodiments of the present disclosure, the host 120 may detect luminance (for example, relative luminance) based on an image of the display device 110 which is captured by the camera 130, and update the gain value GAIN stored in the lookup table LUT based on the detected luminance. The timing controller 340 may generate the second image data DATA2 based on the gain value GAIN stored in the lookup table LUT and the first image data DATA1.

According to an embodiment, the timing controller 340 may be disposed in the display device 110 as a logic type. According to an embodiment, the timing controller 340 may be disposed in the display device 110 as a processor type. The timing controller 340 may include one or more memories (for example, registers, or so on). In one embodiment, the memory 345 in which the lookup table LUT is stored may be implemented by a register.

The power supply circuit 350 may be configured to output a constant voltage of a constant voltage level. The power supply circuit 350 may output power voltages (for example, the first power voltage VDD, the second power voltage VSS, and so on) supplied to the display panel 310. According to an embodiment, the power supply circuit 350 may output voltages (for example, a gate high voltage, a gate low voltage, and so on) supplied to the scan driving circuit 330. According to an embodiment, the power supply circuit 350 may output voltages (for example, a gamma voltage, a reference voltage, and so on) supplied to the data driving circuit 320. The power supply circuit 350 may include, for example, a regulator (for example, a low dropout (LDO) regulator, or so on). The power supply circuit 350 may be implemented by, for example, a power management integrated circuit (PMIC).

The display device 110 may receive the first image data DATA1, the control signal CS, the gain value GAIN, and so on from the host 120 through a predetermined interface. The interface may be, for example, an SPI, an I2C, an MIPI, or so on. However, the embodiments of the present disclosure are not limited thereto.

Figure 4:
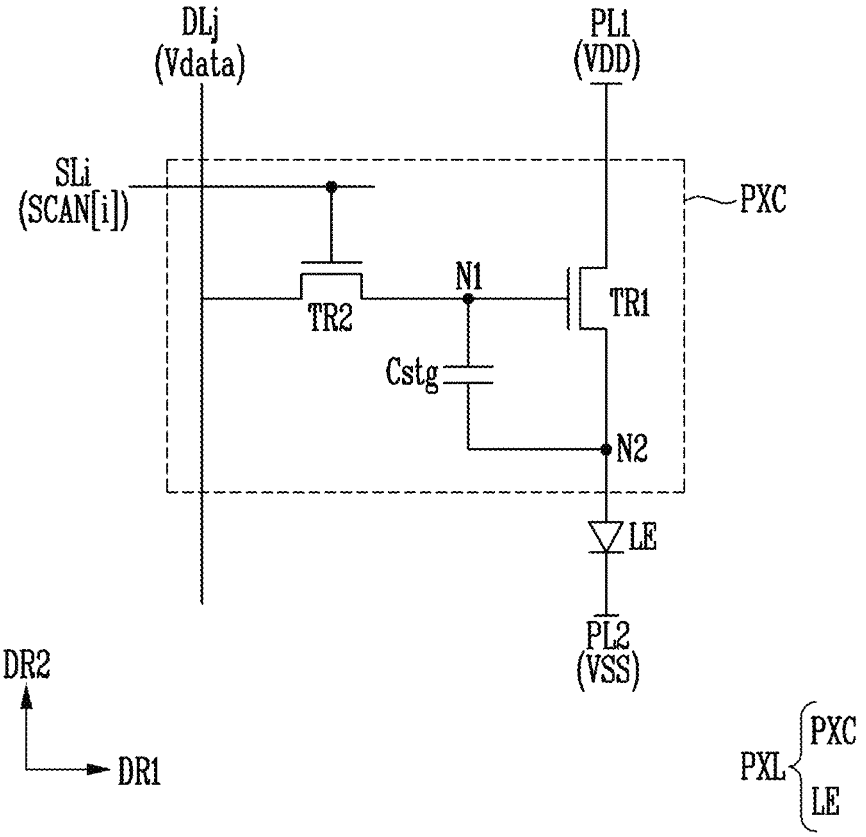
FIG. 4 is an embodiment of a pixel.

FIG. 4 is an example of the pixel PXL.

The pixel PXL according to the embodiments of the present disclosure may include a light emitting element LE and a pixel circuit PXC configured to supply a current (for example, a drive current) to the light emitting element LE. The pixel circuit PXC may include two or more switching elements (for example, transistors) and one or more storage elements (for example, capacitors).

The pixel PXL of FIG. 4 is described as an example in which the pixel PXL is connected to a j-th data line DLj (j is an integer greater than or equal to 1) and an i-th scan line SLi (i is an integer greater than or equal to 1).

Referring to FIG. 4, the pixel circuit PXC according to the embodiments of the present disclosure may include a first transistor TR1, a second transistor TR2, and a storage capacitor Cstg. However, the embodiments of the present disclosure are not limited thereto, and a configuration of the pixel circuit PXC may be freely implemented according to the design of a person skilled in the art.

The light emitting element LE may include a first electrode (one of an anode and a cathode), a second electrode (the other of the anode and the cathode), and a light emitting layer. The light emitting layer may include, for example, an organic material or an inorganic material. For example, the light emitting element LE may be implemented by an organic light emitting element (an organic light emitting diode) having an organic light emitting layer.

Referring to FIG. 4, the first electrode (for example, an anode) of the light emitting element LE may be electrically connected to a second node N2. The second electrode (for example, a cathode) of the light emitting element LE may be electrically connected to a second power line PL2.

The second power voltage VSS is applied to the second power line PL2. The second power voltage VSS) may be, for example, a ground voltage or a low-potential voltage having a level lower than the ground voltage.

The first transistor TR1 may be connected between a first power line PL1 and the second node N2. The first transistor TR1 may include a gate electrode, a first electrode (one of a source electrode and a drain electrode), and a second electrode (the other of the source electrode and the drain electrode). The gate electrode of the first transistor TR1 may be electrically connected to a first node N1. The first electrode (for example, the drain electrode) of the first transistor TR1 may be electrically connected to the first power line PL1. The first power voltage VDD may be applied to the first power line PL1. The first power voltage VDD may be, for example, a high-potential voltage. The second electrode (for example, the source electrode) of the first transistor TR1 may be electrically connected to the second node N2. A data voltage Vdata or a voltage corresponding to the data voltage Vdata may be applied to the first node N1. A current (for example, a drive current) having a magnitude corresponding to the voltage applied to the first node N1 may flow through the first transistor TR1.

The second transistor TR2 may be configured to switch an electrical connection between a data line DLj and the first node N1. An operation timing of the second transistor TR2 may be controlled by a first scan signal SCAN[i]. The first scan signal SCAN[i] may be applied to an i-th first scan line SCLi (hereinafter, abbreviated as a first scan line SCLi). The second transistor TR2 may turn on in response to the first scan signal SCAN[i] of a turn-on level. When the second transistor TR2 turns on, the data voltage Vdata may be applied to the first node N1.

The storage capacitor Cstg may be configured to maintain a voltage difference between the first node N1 and the second node N2. The storage capacitor Cstg may include a first electrode electrically connected to the first node N1 and a second electrode electrically connected to the second node N2. The storage capacitor Cstg may be an intentionally and physically formed capacitor element, not a parasitic capacitor.

Referring to FIG. 4, the first and second transistors TR1 and TR2 may each include an N-type semiconductor layer. In this case, turn-on level voltages of the first and second transistors TR1 and TR2 may each be a high-level voltage (for example, a gate high voltage), and turn-off level voltages of the first and second transistors TR1 and TR2 may each be a low-level voltage (for example, a gate low voltage). According to an embodiment, at least one of the first and second transistors TR1 and TR2 may include a P-type semiconductor layer. In this case, a turn-on level voltage of a transistor including the P-type semiconductor layer may be a low level voltage (for example, the gate low voltage), and a turn-off level voltage of the transistor may be a high level voltage (for example, the gate high voltage).

At least one of the first and second transistors TR1 and TR2 may include a semiconductor layer of amorphous silicon (a-Si). At least one of the first and second transistors TR1 and TR2 may include a semiconductor layer of polycrystalline silicon (poly-Si). At least one of the first and second transistors TR1 and TR3 may include an oxide semiconductor layer including a metal oxide.

Figure 5:
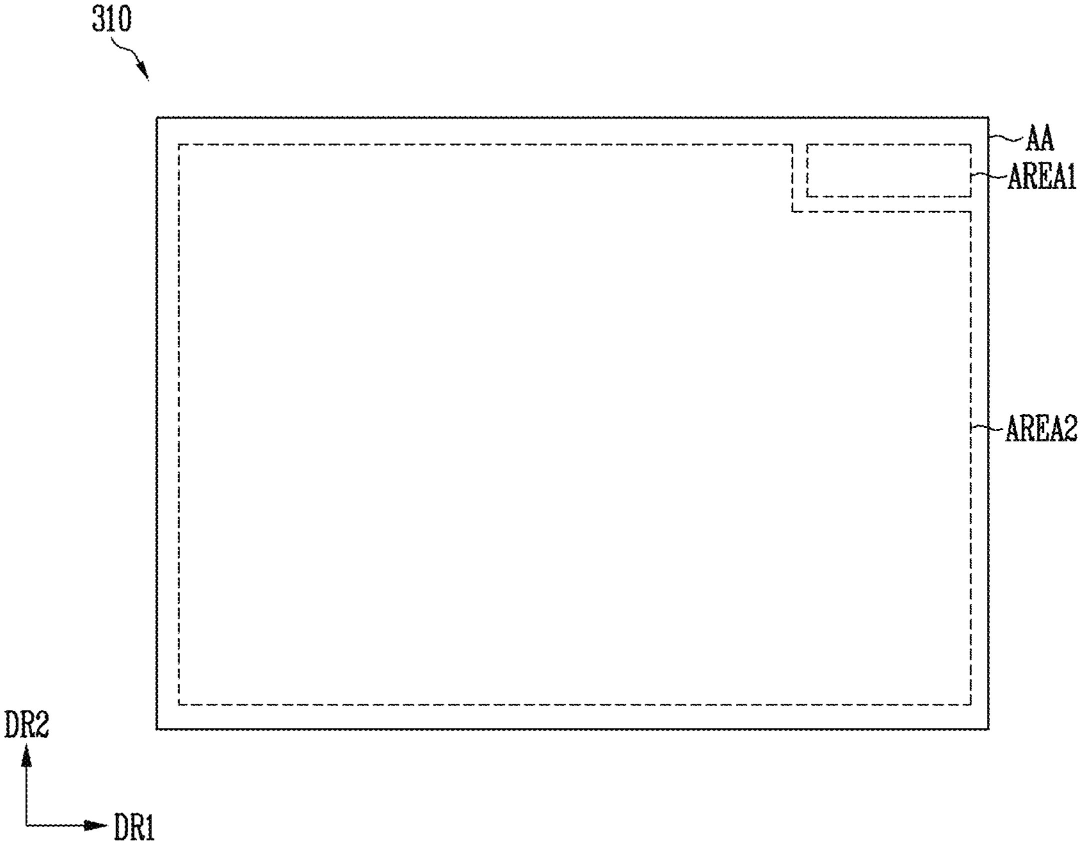
FIG. 5 is an embodiment of a display area.

FIG. 5 is an embodiment of the display area AA.

The display panel 310 may include the display area AA. The display area AA may include a first area AREA1 and a second area AREA2.

The first area AREA1 may be a fixed pattern area where information that is constantly provided to a user is displayed. The second area AREA2 may be a content area where changed information is displayed in response to a user's request.

Information is continuously displayed in the first area AREA1, and accordingly, the light emitting element LE (see FIG. 4) in the first area AREA1 may deteriorate relatively more quickly. On the other hand, different contents are displayed in the second area AREA2 according to a user's response, and accordingly, the light emitting element LE in the second area AREA2 may deteriorate relatively more slowly.

Therefore, the luminance of the first area AREA1 may decrease relatively quickly over time, and the luminance of the second area AREA2 may decrease relatively slowly compared to the luminance of the first area AREA1. Therefore, in order to compensate for the luminance change of the first area AREA1, an image (for example, a fixed pattern) may be displayed with reference to the lookup table LUT (see FIG. 4).

Figure 6:
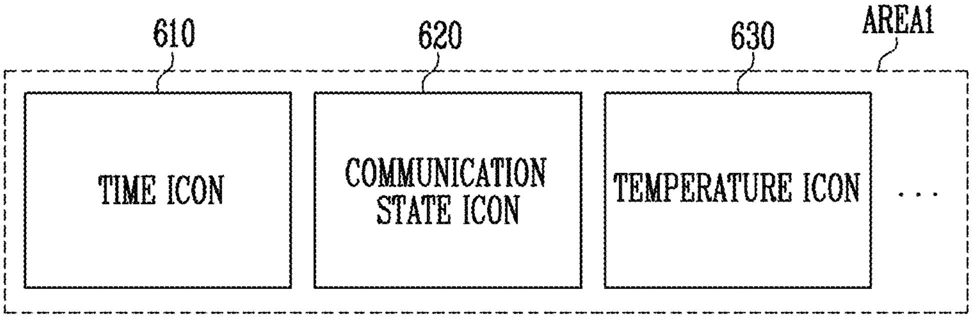
FIG. 6 is an example of fixed patterns displayed in a first area.

FIG. 6 is an example of fixed patterns displayed in the first area AREA1.

In one embodiment, the fixed patterns displayed in the first area AREA1 may include a time icon 610, a communication state icon 620, a temperature icon 630, and so on.

The time icon 610 may provide information on the current time. The communication state icon 620 may provide information on an Internet connection environment. The temperature icon 630 may provide indoor or outdoor temperature.

However, the fixed patterns according to the embodiments of the present disclosure are not limited thereto, and the fixed patterns displayed in the first area AREA1 may change depending on designs of a person skilled in the art.

Figure 7A:
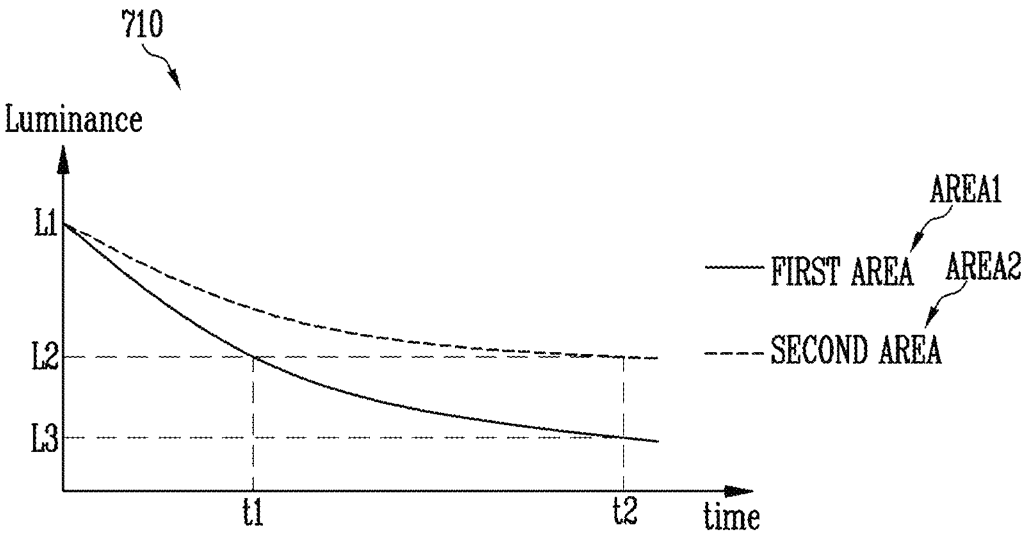
FIG. 7A is a graph illustrating a change in luminance over time in the first area and a second area.

FIG. 7A is a graph 710 illustrating a change in luminance over time in the first area AREA1 and the second area AREA2.

The luminance of the first area AREA1 and the luminance of the second area AREA2 may be the same as first luminance L1 in an initial state.

The luminance of the first area AREA1 may gradually decrease from second luminance L2 to third luminance L3 as time flows from first time t1 to second time t2. The second luminance L2 may be lower than the first luminance L1, and the third luminance L3 may be lower than the second luminance L2.

Under the same conditions, the luminance of the second area AREA2 may gradually decrease to the second luminance L2 as the time flows from the first time t1 to the second time t2. During the above period, the luminance of the second area AREA2 may be relatively higher than the luminance of the first area AREA1.

The time when an image is displayed in the first area AREA1 is relatively long, and accordingly, the light emitting element LE (see FIG. 4) in the first area AREA1 may deteriorate faster than the light emitting element LE in the second area AREA2. Accordingly, the luminance in the first area AREA1 may decrease relatively fast.

Figure 7B:
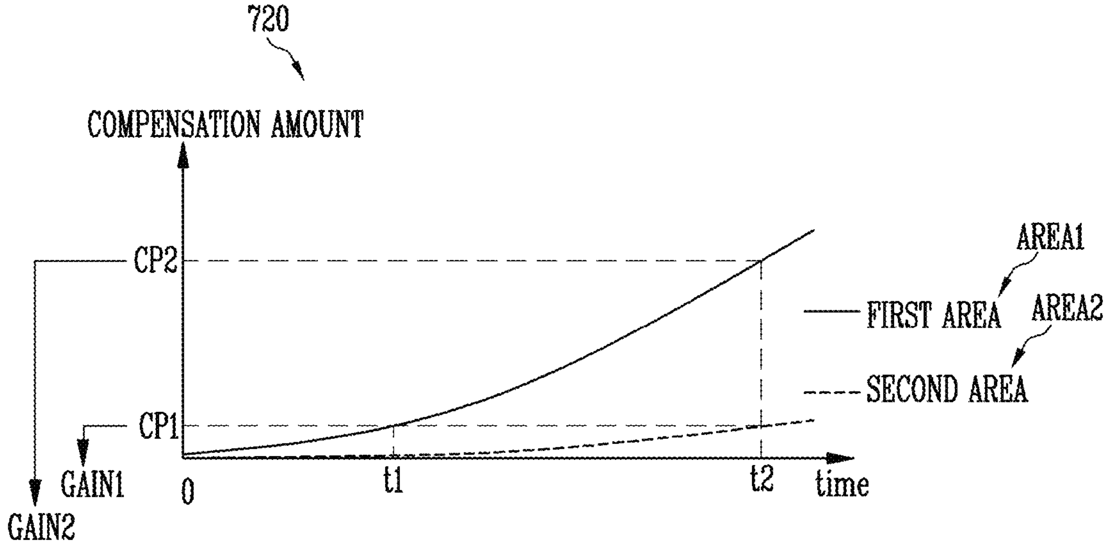
FIG. 7B is a graph illustrating compensation amounts corresponding to luminance decrease amounts in the first area and the second area.

FIG. 7B is a graph 720 illustrating compensation amounts corresponding to luminance decrease amounts in the first area AREA1 and the second area AREA2.

A compensation amount may correspond to a luminance decrease amount of the light emitting element LE (see FIG. 4). The compensation amount is a value for compensating for deterioration (or afterimage due to the deterioration) of the light emitting element LE and may be used in the same meaning as an afterimage compensation amount.

For example, the compensation amount of the first area AREA1 may be a first value CP1 at a first time t1, and the compensation amount may be a second value CP2 at a second time t2. The compensation amount of the second area AREA2 may be the first value CP1 at the second time t2.

A gain value corresponding to the compensation amount of the first value CP1 may be a first gain value GAIN1. A gain value corresponding to the compensation amount of the second value CP2 may be a second gain value GAIN2.

A luminance decrease amount (or afterimage) of the light emitting element LE (see FIG. 4) may be compensated by the gain values.

Figures 8, 9:
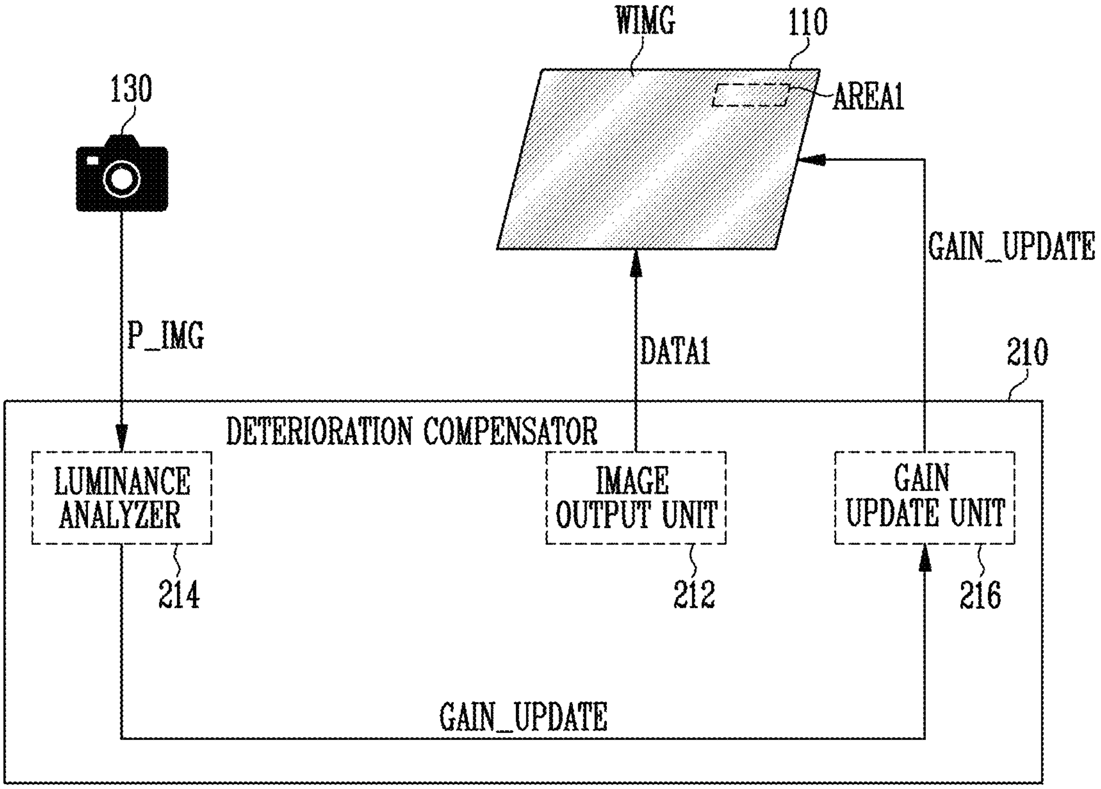
FIG. 8 is an embodiment of a lookup table showing gain values for compensating for a change in luminance.
FIG. 9 is a diagram illustrating an interaction between a deterioration compensator, a camera, and a display device according to embodiments of the present disclosure.

FIG. 8 is an example of a lookup table LUT showing a gain value 820 for compensating for a change in luminance.

Referring to FIG. 8, the lookup table LUT may include pieces of information for compensating for a luminance decrease amount of the first area AREA1 (see FIG. 5) described above. The lookup table LUT may include a time 810 and the gain value 820 corresponding to the time 810.

For example, a gain value corresponding to a first time t1 may be a first gain value GAIN1. A gain value corresponding to a second time t2 may be a second gain value GAIN2. Based on this, a luminance decrease amount of the first area AREA1 (see FIG. 5) may be compensated for.

Meanwhile, the lookup table LUT is stored at the time when the display device 110 (see FIG. 1) is shipped, and the gain value 820 may need to be changed depending on environments in which the display device 110 is actually used. For example, when the first area AREA1 (see FIG. 5) is overcompensated and displayed relatively brighter than the second area AREA2 (see FIG. 5), the gain value 820 may need to be changed. Alternatively, when the first area AREA1 is undercompensated and displayed relatively darker than the second area AREA2, the gain value 820 may need to be changed. A technical task of the embodiments of the present disclosure is to solve the problems.

FIG. 9 is a diagram illustrating an interaction between the deterioration compensator 210, the camera 130, and the display device 110 according to the embodiments of the present disclosure.

Referring to FIG. 9, the deterioration compensator 210 may include an image output unit 212, a luminance analyzer 214, and a gain update unit 216.

The image output unit 212 may be configured to output first image data DATA1 to the display device 110. The display device 110 may correct the first image data DATA1 based on the gain value 820 (see FIG. 8) of the previously stored lookup table LUT (see FIG. 8) and display the corrected image. The image displayed by the display device 110 according to the first image data DATA1 may include a high-grayscale image WIMG. The high-grayscale image WIMG may include, for example, a full-white image. In another embodiment, the high-grayscale image WIMG may include an image including the fixed patterns described above in FIG. 6 and displayed in white-grayscale in the first area AREA1. The camera 130 may capture an image of the display device 110 while the high-grayscale image WIMG is displayed on the display device 110.

The luminance analyzer 214 may receive a captured image P_IMG from the camera 130. The luminance analyzer 214 may determine the relative luminance between the first area AREA1 and surrounding areas from the captured image P_IMG and generate an updated gain value GAIN_UPDATE based on the determined result.

The gain update unit 216 may receive the updated gain value GAIN_UPDATE and output the received updated gain value GAIN_UPDATE to the display device 110. The display device 110 may update the lookup table LUT (see FIG. 8) based on the updated gain value GAIN_UPDATE.

Figure 10:
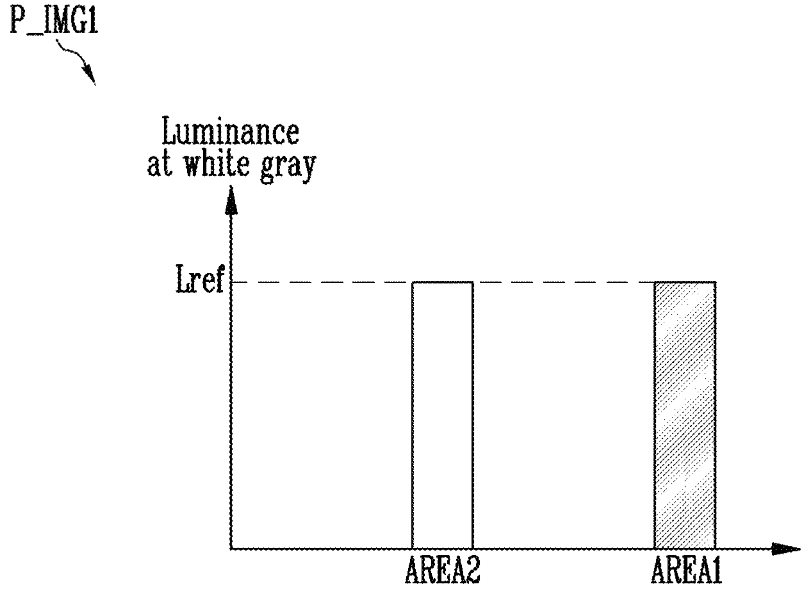
FIGS. 10, 11, and 12 are diagrams illustrating comparison of luminance for each area of a captured high-grayscale image, and gain values being updated according thereto.
Figure 11:
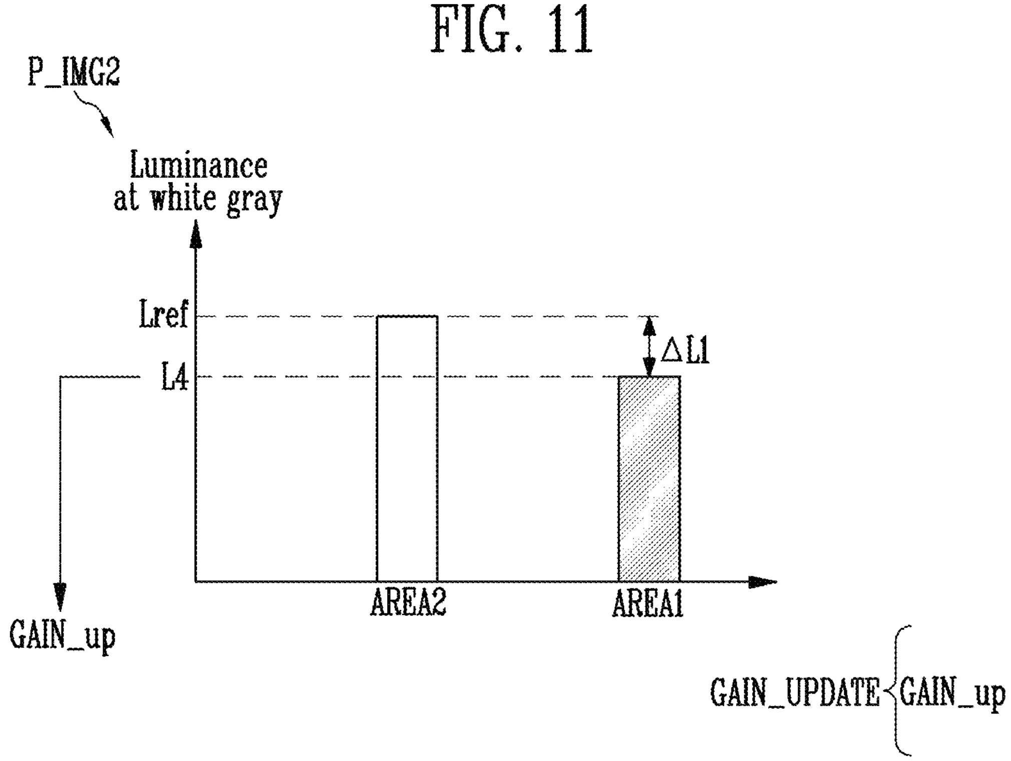
Figures 12, 13:
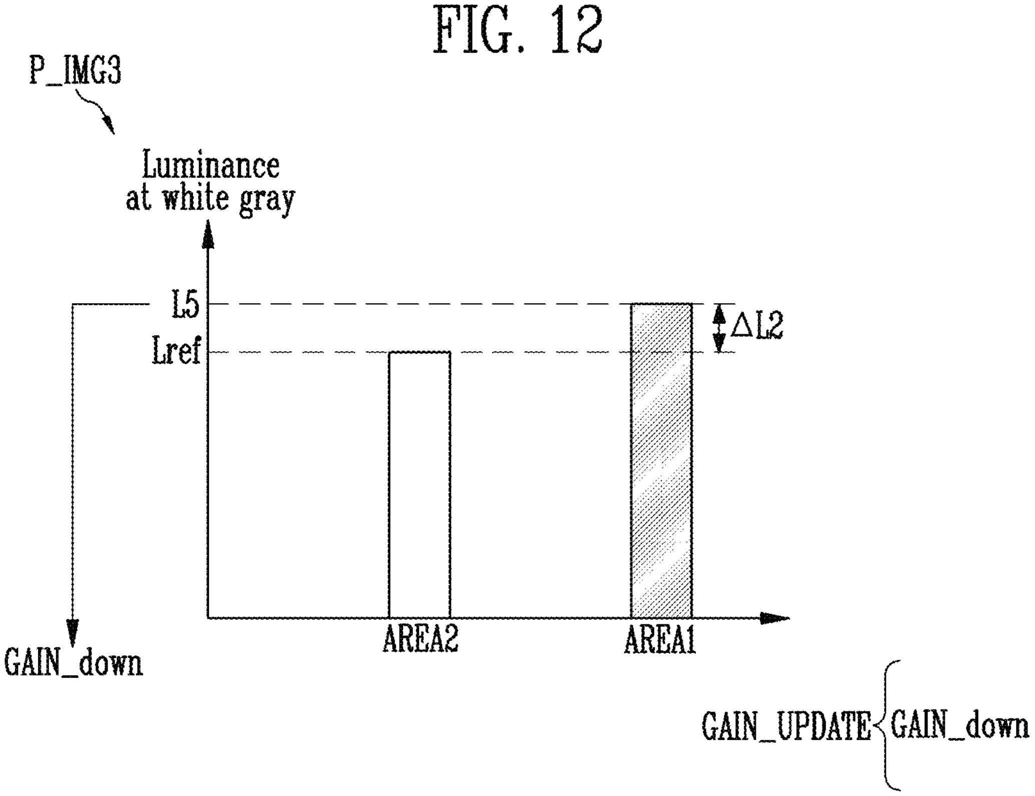
FIG. 13 is a diagram illustrating that updated gain values are reflected in the lookup table of FIG. 8.

FIGS. 10 to 12 illustrate luminance comparison for each area between captures high-grayscale images, and gain values being updated according thereto.

For the sake of convenience of description, the high-grayscale images are described as, for example, white-grayscale images. However, the embodiments of the present disclosure are not limited thereto.

Referring to FIGS. 10 to 12, the luminance of the white-grayscale image displayed in the second area AREA2 may be set to reference luminance Lref. When the luminance displayed in the first area AREAL is higher than the reference luminance Lref, the luminance of a corresponding area may be determined to be relatively high. When the luminance displayed in the first area AREA1 is lower than the reference luminance Lref, the luminance of a corresponding area may be determined to be relatively low.

FIG. 10 illustrates that the luminance of the white-grayscale image of the first area AREA1 in the captured first image P_IMG1 is the same as the reference luminance Lref. In this case, the gain value for the first area AREA1 may be maintained at the existing value.

FIG. 11 illustrates that the luminance of the white gradation image of the first area AREA1 in the captured second image P_IMG2 is fourth luminance LA. The fourth luminance L4 may be lower than the reference luminance Lref by a first magnitude (AL1). In this case, the first area AREA1 may be insufficiently compensated for luminance even with the existing gain value. Accordingly, a larger gain value GAIN_up may be set to increase the luminance by the first size ΔL1. This larger gain value GAIN_up may be included in the updated gain value GAIN_UPDATE.

FIG. 12 illustrates that the luminance of the white-grayscale image of the first area AREA1 in the captured third image P_IMG3 is fifth luminance L5. The fifth luminance L5 may be higher than the reference luminance Lref by a second magnitude ΔL2. In this case, the first area AREA1 may be excessively compensated for luminance by the existing gain value. Accordingly, a less gain value GAIN_down may be set to cause the luminance to be lowered by the second magnitude ΔL2. The less gain value GAIN_down may be included in the updated gain value GAIN_UPDATE.

FIG. 13 is a diagram showing the lookup table of FIG. 8 in which the updated gain value GAIN_UPDATE is reflected.

Referring to FIG. 13, the gain value 820 of the second time t2 may be different from the lookup table LUT of FIG. 8. For example, the gain value 820 of the second time t2 may be changed to the updated gain value GAIN_UPDATE.

Due to this, the gain value 820 that matches the degree of deterioration of the light emitting element LE (see FIG. 4) may be set. Due to this, display quality may be improved, and power consumption may be reduced.

Figure 14A:
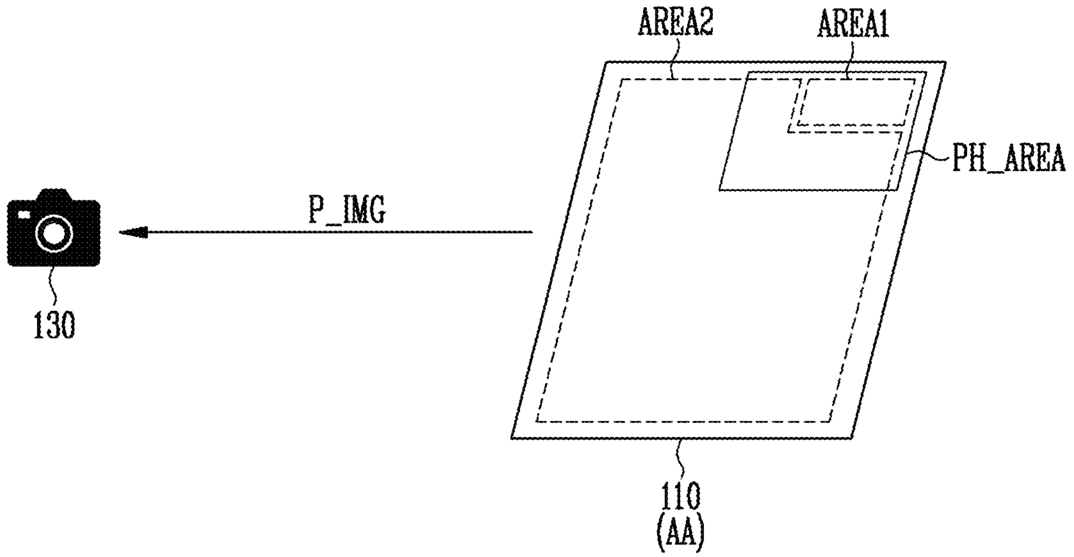
FIG. 14A is an example in which a camera captures an image of a display device.

FIG. 14A is an example in which the camera 130 captures an image of the display device 110.

Referring to FIG. 14A, the camera 130 may capture an image of the display device 110 (or the display area AA of the display device 110) on an opposite side of the display device 110.

A predetermined capturing area PH_AREA of the display areas AA may be captured by the camera 130. The capturing area PH_AREA may include a first area AREA1 and a second area AREA2 around the first area AREA1.

A captured image P_IMG acquired by the camera 130 may be a direct image of the display device 110.

Figure 14B:
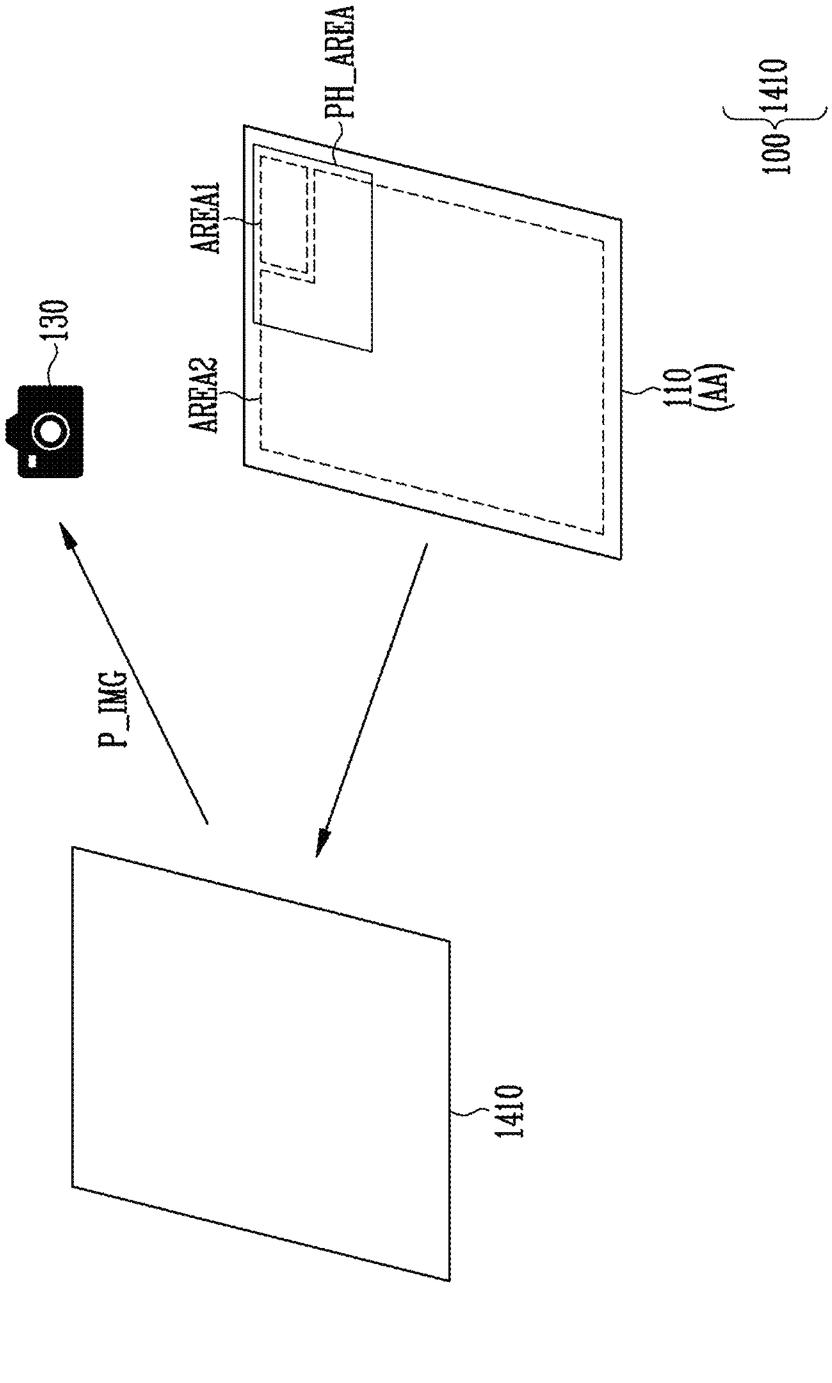
FIG. 14B is another example in which a camera captures an image of a display device.

FIG. 14B is another example in which the camera 130 captures an image of the display device 110.

Referring to FIG. 14B, the camera 130 may capture an image of the display device 110 through a mirror 1410 on the same side as the display device 110. For example, the camera 130 and the display device 110 may be parallel to the mirror 1410 on the side facing the mirror 1410.

In the above embodiments, the display system 100 may include the mirror 1410.

The display device 110 may capture an image of a predetermined capturing area PH_AREA reflected on the mirror 1410.

According to the embodiment, the camera 130 may be embedded in the display device 110 or may be configured separately without being embedded in the display device 110. In the embodiment where the camera 130 is not embedded in the display device 110, the camera 130 may be positioned above the display device 110, next to the display device 110, or below the display device 110.

According to the embodiment, two or more cameras 130 may capture an image of the display device 110 reflected on the mirror 1410.

Figure 15:
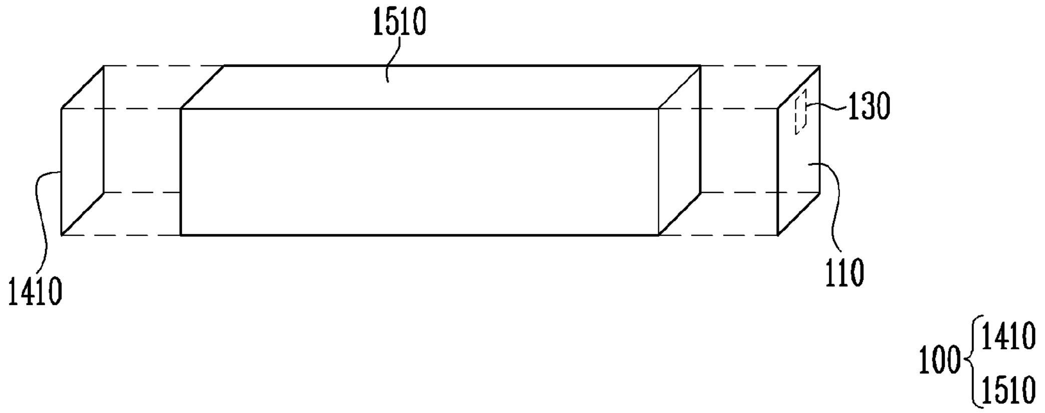
FIG. 15 is a view illustrating an example in which a camera captures an image of a display device through a mirror in a dark room.

FIG. 15 is a view illustrating an example in which the camera 130 captures an image of the display device 110 through the mirror 1410 in a dark room 1510.

For the sake of convenience of description, an example in which the camera 130 is embedded in the display device 110 is illustrated. However, the embodiments of the present disclosure are not limited thereto.

The display device 110 may display the high-grayscale image WIMG (see FIG. 9), and the camera 130 may capture an image of the display device 110 reflected on the mirror 1410 in the dark room 1510. In the above embodiment, the display system 100 may include the mirror 1410 and the dark room 1510.

The dark room 1510 is configured to remove the influence of external light on the image of the display device 110 which is captured by the camera 130. The dark room 1510 may completely surround the display device 110, the camera 130, and the mirror 1410. Accordingly, the problem that the luminance of each area is not properly measured due to the external light reflected on the display device 110 and incident on the camera 130 may be resolved.

In one embodiment, the mirror 1410 may be disposed at a predetermined position (for example, an opposite side of the display device 110) under the control of the host 120 (see FIG. 1). In one embodiment, the dark room 1510 may be disposed (for example, completely surround the display device 110, the camera 130, and the mirror 1410) in a predetermined position under the control of the host 120. However, the embodiments of the present disclosure are not limited thereto, and the mirror 1410 and the dark room 1510 may be disposed in a predetermined position according to an input through a separate input device (for example, a remote controller or so on).

Figure 16:
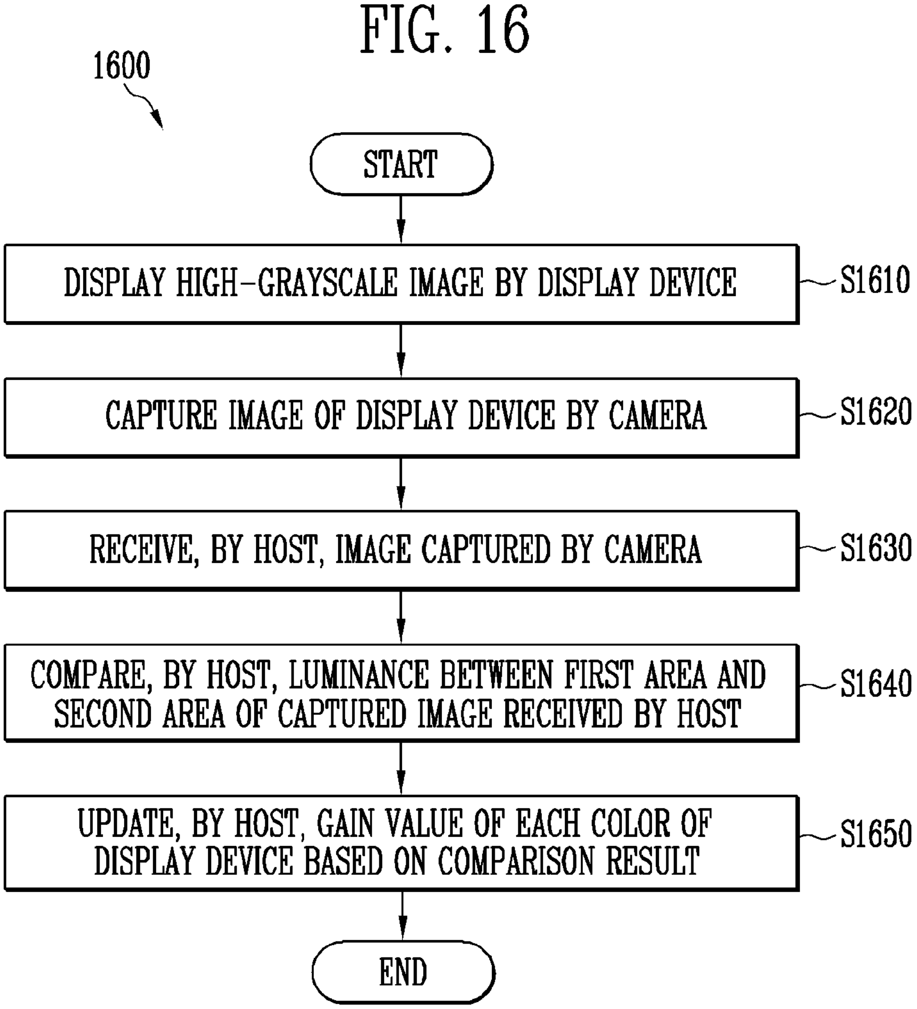
FIG. 16 is a flowchart of a driving method of a display system, according to embodiments of the present disclosure.

FIG. 16 is a flowchart of a driving method (1600) of a display system, according to embodiments of the present disclosure.

Referring to FIG. 16, the driving method 1600 of a display system, according to embodiments of the present disclosure, may include step S1610 of displaying a high-grayscale image by a display device, step S1620 of capturing an image of the display device by a camera, step S1630 of receiving, by a host, the image captured by the camera, step S1640 comparing, by the host, luminance between a first region and a second region in the image received by the host, and step S1650 updating, by the host, a gain value of each color of the display device based on a comparison result.

Figure 17A:
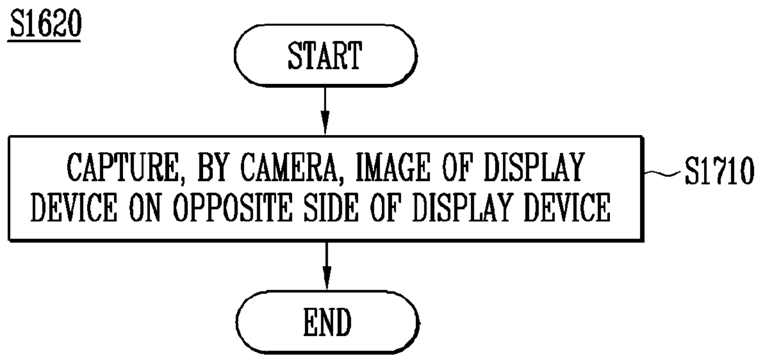
FIG. 17A is an embodiment in which a camera of FIG. 16 captures an image of a display device.

FIG. 17A is an embodiment of the step S1620 of capturing an image of a display device of FIG. 16 by a camera.

In one embodiment, the step S1620 of capturing the display device by the camera may include step S1710 of capturing, by the camera, the image of the display device on an opposite side of the display device.

Figure 17B:
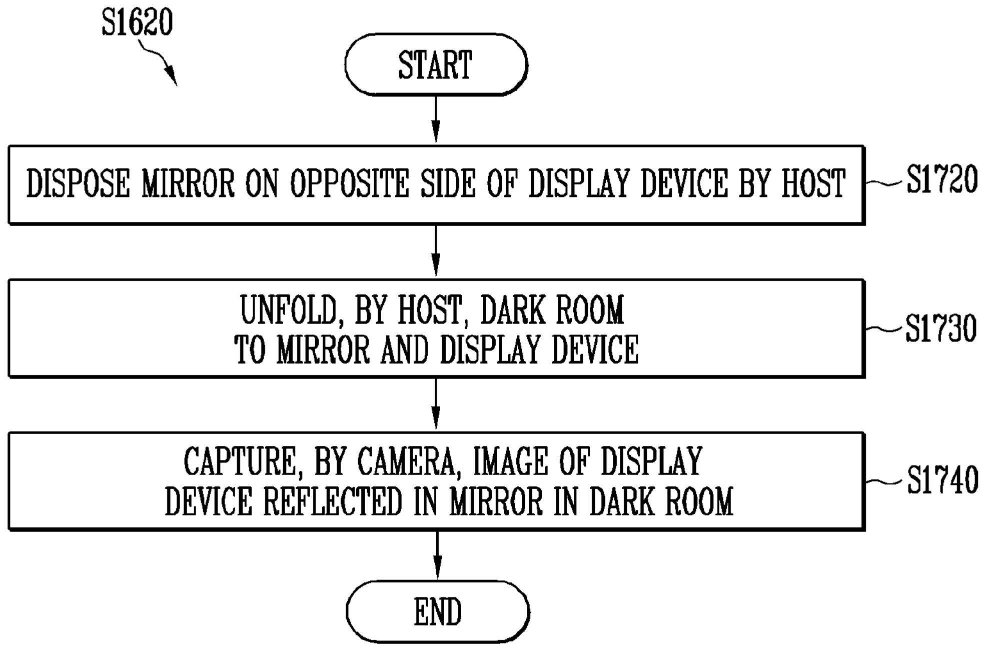
FIG. 17B is another embodiment in which the camera of FIG. 16 captures an image of a display device.

FIG. 17B is another embodiment of the step S1620 of capturing an image of a display device by the camera of FIG. 16.

In one embodiment, the step S1620 of capturing the display device by the camera may include step S1720 of disposing a mirror on an opposite side of the display device by the host, step S1730 of unfolding, by the host, a dark room surrounding the mirror and the display device, and step S1740 of capturing, by the camera, an image of the display device reflected in the mirror in the dark room.

Figure 18:
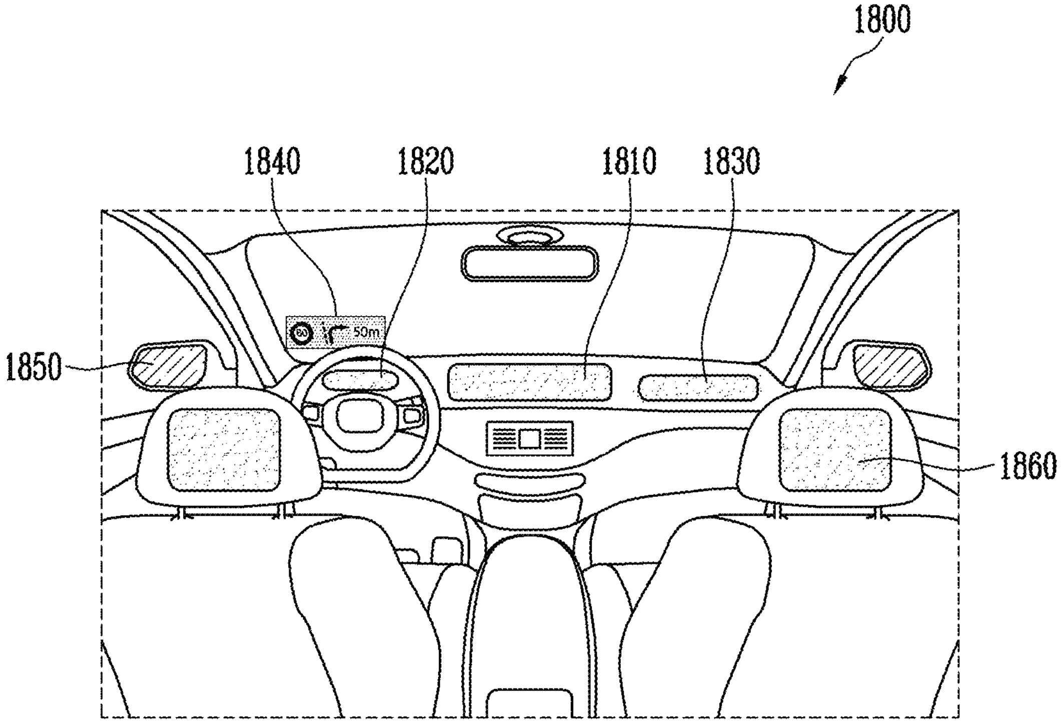
FIG. 18 is an embodiment in which a display system according to embodiments of the present disclosure is applied.

FIG. 18 is an embodiment in which the display system 100 (see FIG. 1) according to the embodiments of the present disclosure is applied.

Referring to FIG. 18, the display system 100 of FIG. 1 may be applied to an automotive display system 1800. Here, the automotive display system 1800 may include a computing system that is provided inside or outside a vehicle and provides image data.

For example, the display system 100 of FIG. 1 may be applied to at least one of an infotainment panel 1810, a cluster 1820, a co-driver display 1830, a head-up display 1840, a side mirror display 1850, and a rear seat display 1860 which are included in a vehicle.

However, the embodiment to which the display system 100 of FIG. 1 is applied is not limited thereto. For example, the display system 100 according to the embodiments of the present disclosure may be applied to portable electronic devices, such as a mobile phone, a smartphone, a tablet personal computer (PC), a smart watch, a watch phone, a mobile communication terminal, an electronic notebook, an electronic book, a portable multimedia player (PMP), a navigation system, and an ultra-mobile personal computer (UMPC), or various products, such as a television, a laptop computer, a monitor, a billboard, and an Internet of Things (IoT) device.

The drawings and details of the present disclosure described above are merely examples of the present disclosure, and are used only for the purpose of describing the present disclosure, and are not used to limit the scope of the present disclosure described in the claims or the meaning thereof. Therefore, those skilled in the art will understand that various modifications and equivalent other embodiments may be made therefrom. Thus, the true technical protection scope of the present disclosure should be determined by the technical idea of the appended claims.

According to embodiments of the present disclosure, a display system and a driving method of the display system may check whether a gain value of a display device is appropriate and may update the gain value.

What is claimed is:

1. A display system comprising:
a display device including a first area where a fixed pattern is displayed and a second area where content is displayed, and configured to display an image in the first area and the second area by referring to a memory where a gain value is stored;
a camera configured to generate a captured image by capturing at least a part of the first area or at least a part of the second area around the first area and capturing an image of the display device that displays a high-grayscale image;
a host configured to receive the captured image and update the gain value based on a luminance difference between the first area and the second area;
a mirror positioned on an opposite side of the display device and the camera, and
a darkroom surrounding the display device, the camera, and the mirror,
wherein the camera captures an image of the display device reflected on the mirror
wherein the host causes the mirror to be positioned opposite the display device and the camera, and controls the darkroom to be unfolded by surrounding the display device, the camera, and the mirror.

2. A display system in claim 1, wherein the host includes:
an image output unit configured to output first image data corresponding to the image;
a luminance analyzer configured to generate an updated gain value by receiving the captured image and detecting the luminance difference between the first area and the second area; and
a gain update unit configured to write an updated gain value to the display device.

3. The display system of claim 2, wherein
the luminance analyzer sets luminance of the second area as a reference luminance, and compares luminance of the first area with the reference luminance.

4. The display system of claim 3, wherein
the luminance analyzer determines that the gain value of the display device is insufficiently compensated when the luminance of the first area is lower than the reference luminance, and sets a gain value greater than the gain value as the updated gain value.

5. The display system of claim 3, wherein
the luminance analyzer determines that the gain value of the display device is excessively compensated when the luminance of the first area is higher than the reference luminance, and sets a gain value less than the gain value as the updated gain value.

6. The display system of claim 1, wherein
the fixed pattern includes at least one of a time icon, a communication state icon, and a temperature icon.

7. The display system of claim 1, wherein
a gain value for each color is stored in the memory.

8. A method of driving a display system, the driving method comprising:
displaying a high-grayscale image by a display device;
capturing an image of the display device by a camera;
receiving, by a host, an image captured by the camera;
comparing luminance between a first area and a second area from the captured image received by the host; and
updating, by the host, gain values of each color of the display device based on a comparison result,
wherein the capturing of the image of the display device by the camera includes:
disposing a mirror on an opposite side of the display device by the host;
unfolding a darkroom surrounding the mirror and the display device by the host; and
capturing, by the camera, an image of the display device reflected in the mirror within the darkroom.

9. The method of claim 8, wherein
the camera is embedded in the display device.

10. The method of claim 8, wherein,
in the displaying of the high-grayscale image by the camera, the display device displays a white-grayscale image.

11. The method of claim 8, wherein
the first area is an area in which a fixed pattern is displayed, and the second area is an area in which content is displayed.

12. The method of claim 11, wherein
the fixed pattern includes at least one of a time icon, a communication state icon, and a temperature icon.

13. The method of claim 8, wherein,
in the comparing of the luminance between the first area and the second area from the captured image received by the host, the host sets luminance of the second area as a reference luminance and compares luminance of the first area with the reference luminance.

14. The method of claim 13, wherein,
when the luminance of the first area is lower than the reference luminance, the host determines that one of the gain values of each color of the display device is insufficiently compensated, and sets a gain value greater than the one of the gain values as an updated gain value.

15. The method of claim 13, wherein,
when the luminance of the first area is higher than the reference luminance, the host determines that one of the gain values of each color of the display device is excessively compensated, and sets a gain value less than the one of the gain values as an updated gain value.

* * * * *